United States Patent [19]

Stocchiero

[11] Patent Number: 5,053,296

[45] Date of Patent: * Oct. 1, 1991

[54] LID FOR ACCUMULATOR BATTERIES SUITED TO ABSORBS THE DEFORMATION OF THE POLES

[76] Inventor: Olimpio Stocchiero, 5 Via Kennedy, 36050 Montorso Vicentino (VI), Italy

[ * ] Notice: The portion of the term of this patent subsequent to Feb. 6, 2007 has been disclaimed.

[21] Appl. No.: 517,704

[22] Filed: May 2, 1990

[30] Foreign Application Priority Data

May 26, 1989 [IT] Italy ................................ 85597 A/89

[51] Int. Cl.5 ............................................ H01M 2/04
[52] U.S. Cl. .................................... 429/175; 429/180; 429/66
[58] Field of Search ................. 429/175, 180, 66, 178, 429/179, 181, 182, 183, 185, 163

[56] References Cited

U.S. PATENT DOCUMENTS

| | | | |
|---|---|---|---|
| 2,901,527 | 8/1959 | Mocas | 429/180 |
| 3,064,068 | 11/1962 | Fouch | 429/180 |
| 3,981,759 | 9/1976 | Summo | 429/180 X |
| 4,455,356 | 6/1984 | Barrett, Jr. | 429/178 X |
| 4,467,021 | 8/1984 | Stocchiero | 429/175 |
| 4,859,547 | 8/1989 | Adams et al. | 429/180 X |
| 4,898,795 | 2/1990 | Stocchiero | 429/66 |

Primary Examiner—Anthony Skapars
Attorney, Agent, or Firm—Birch, Stewart, Kolasch & Birch

[57] ABSTRACT

The invention discloses a lid made of plastic (1,20,30) for lead-acid accumulator batteries wherein at least each opening for the passage of the positive poles presents an externally cylindrical collar (6,21,31) having nearly the same diameter as the openings, wherein said collar (6,21,31) receives in its interior the bush (7,15,34) blocking the pole (4,23,33) of the accumulator battery and is connected with the lid through an elastic diaphragm (10,25,35) having a circular cross-section, the upper edge of said diaphragm being attached to the lid and the lower edge is connected with the outer surface of the collar.

According to a preferred embodiment of the invention the elastic diaphragm (10,25) has a toroidal shape.

According to another embodiment the elastic diaphragm (35) acquires the shape of a bellows with a vertical axis.

4 Claims, 2 Drawing Sheets

LID FOR ACCUMULATOR BATTERIES SUITED TO ABSORBS THE DEFORMATION OF THE POLES

The invention discloses a lid made of plastic material for accumulator batteries especially suited to absorb the deformation of the poles.

It is a known fact that in the lead-acid accumulator batteries, the lid of each cell must also guarantee the tightness in order to prevent the electrolyte contained in the accumulator battery from leaking out of the accumulator battery itself and it must also permit the lengthening of the positive pole which becomes longer due to the well known electro-chemical phenomena.

It is therefore important that the lengthening of the positive pole be allowed so as to prevent the pole itself from pressing so against the lid as to cause its breaking up and the ensuing overflow of the electrolyte.

The importance of the ability of the lid to absorb without damages the lengthening of the positive pole becomes particularly evident in the industrial accumulator batteries, wherein the lengthening of the poles are more considerable since the cells can reach heights exceeding 650 mm.

In fact the lengthening of the positive pole due to aging, can vary from 0.5 to 2% of the initial length and it is therefore understandable that the tensions which arise if the positive pole is not allowed to lengthen, easily lead to the detachment of the lid from the container on which it is fixed or to the tearing-up of the lid itself.

Italian patent No. 85653/A/81, which has matured into U.S. Pat. No. 4,467,02, has been registered in the name of the same inventor and it discloses a lid for accumulator batteries, presenting a special concave shape suited to guarantee the elasticity and the lengthening of the poles, even in the case of lids having a limited width in relation to their length, so that it overcomes the above mentioned inconveniences.

This type of lid, however, presents some limitations of elasticity whenever the width is considerably reduced in relation to the length of the lid itself, such as is the case, for instance, of the standard lids type 2PzS according to the DIN 43595 norms.

Another type of solution consists of a concave area of the lid present around the poles, which consists of different diameters with inverted taper becoming narrower downwards and with a thickness which is smaller than the thickness of the lid so that, around each pole there is a flexible area allowing the positive pole to lengthen because of the elastic deformation of the concave wall.

Since this type of solution occupies a significant space around the diameter of the pole expansion, it also is not applicable on those types of batteries wherein the widths of the lids are much reduced in relation to their lengths.

An attempt has been made in order to overcome this inconvenience, whereby the useful diameter of the pole has been decreased to the advantage of the concave area around it. However, this presents the inconvenience of a higher intensity of electric power and therefore an increased heating of the pole itself with a subsequent loss of energy.

The main purpose of the present invention is to overcome the above mentioned inconveniences and to disclose a lid for lead-acid accumulator batteries, wherein the seats lodging the poles, are suited to absorb the lengthening of the poles.

The proposed purpose will be fulfilled while maintaining the lid flat around the pole, so that there will be no large concave area around the pole which might undergo elastic deformations.

All the above mentioned purposes and others which will be better explained hereafter are reached by means of a lid of plastic material for lead-acid accumulator batteries comprising an essentially flat surface having a rectangular shape, presenting two openings for the passage of the poles and at least one opening for the refill of the electrolyte wherein said lid, in accordance with the claims, is characterized in that it presents at least in each opening for the passage of the positive poles an externally cylindrical collar, having approximately the same diameter of the opening wherein said collar receives in its interior the bush blocking the pole and is connected to the lid through an elastic diaphragm having a circular cross-section, wherein the upper edge of said diaphragm is connected with the lid and the lower edge is connected with the outer surface of the collar.

Advantageously, according to the invention, the collar and the elastic diaphragm are moulded of plastic material together with the lid and are integral parts of the same.

In one embodiment of the invention, the lead bush which lodges the pole, is inserted into and blocked on the lid during the moulding process of the latter.

In another embodiment said bush is blocked on the collar by means of sealing rings.

Further scope of applicability of the present invention will become apparent from the detailed description given hereinafter relating to three different embodiments of the invention However it should be understood that the detailed description and specific example, while indicating a preferred embodiment of the invention, are given by way of illustration only, since various changes and modifications within the spirit and scope of the invention will become apparent to those skilled in the art from this detailed description and from the drawings, wherein.

Figure 4:
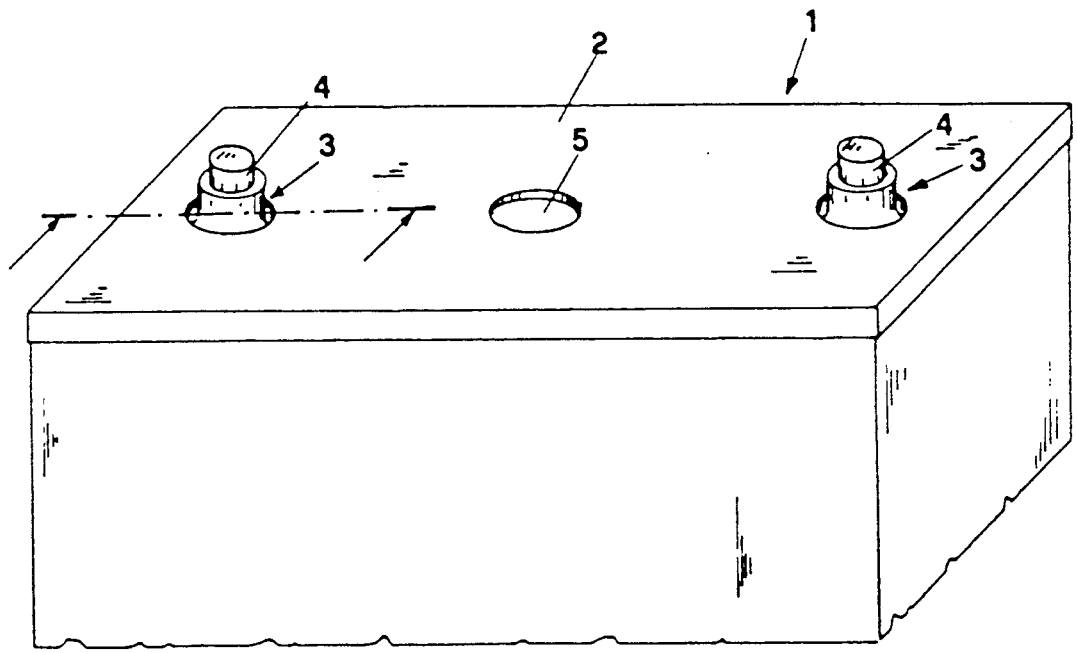
FIG. 4 shows in a perspective view the lid according to the invention, which is connected with a box for accumulator batteries.

With reference to the above mentioned figures and with special reference to FIG. 4, it will be observed that the lid of the accumulator batteries, which is indicated as a whole with 1, presents surface 2 on which there are two openings 3 for the passage of the poles 4 and a central opening 5 for the refill of the electrolyte.

Figure 1:
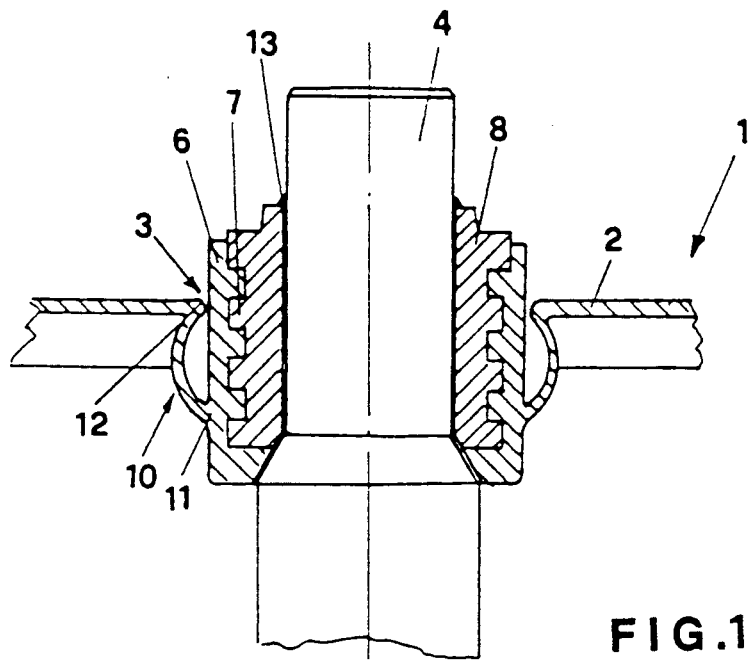
FIG. 1 shows in a cross-section a part of the lid according to the invention with the pole surrounded by a collar equipped with an elastic diaphragm.

Each opening 3 presents, as can be observed in the cross-section of FIG. 1, a collar 6 made of plastic material having a cylindrical outer surface and presenting in its interior, some circular projections 7 which create the anchorage of the lead bush 8 which has been inserted into lid 1 during the moulding process of the thermoplastic material, which the latter is made of.

Collar 6 presents an outer diameter which is nearly equal to the diameter of opening 3 and at its bottom it presents a beveled central opening into which is inserted and passes pole 4 which is blocked through welding against the inner cylindrical surface of bush 8.

Collar 6 is connected with surface 2 of the lid through an elastic diaphragm, indicated with 10, which is connected at a lower point 11 with the collar and at an upper point 12 with the edge of opening 3 of lid 1.

It is obvious that during the aging process of the battery the positive pole 4 expands so that its dimension increases and pushes outwards, so that the elastic diaphragm 10 increases its curvature and collar 6 moves vertically following the thrust caused by the expansion of pole 4.

This movement occurs without causing any deformation of surface 2 of lid 1, so that the planarity of said surface remains unaltered.

Figure 2:
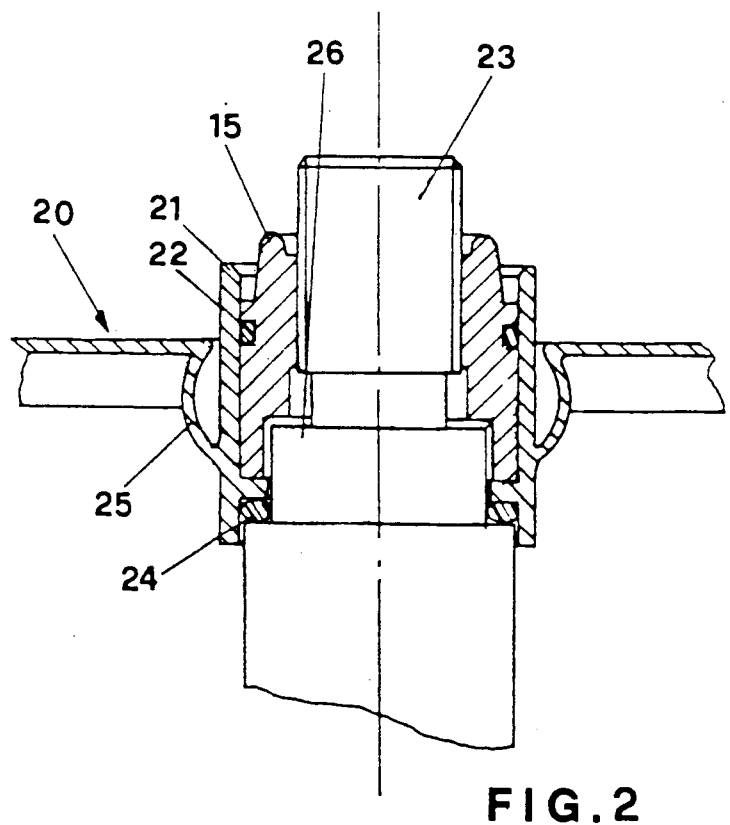
FIG. 2 represents a variation of the embodiment of the collar and of the elastic diaphragm of FIG. 1.

FIG. 2 shows the same embodiment as far as the bush holding collar and the diaphragm joining the collar and the surface of the lid are concerned.

The single variation concerns the bush indicated with 15 which, in the case of FIG. 2, is inserted after the moulding of the lid now indicated with 20. In this case bush 15 can be inserted into collar 21 through its top after the moulding process of the lid and then be blocked through OR 22 ring.

In the case of FIG. 2 pole 23 is screwed on bush 15 and the seal between the electrolyte which is present in the interior of the container and the pole is guaranteed by the presence of the OR 24 ring, of the OR 22 ring and by the contrast of the flat surface 26 of the pole on bush 15 after the screwing.

Figure 3:
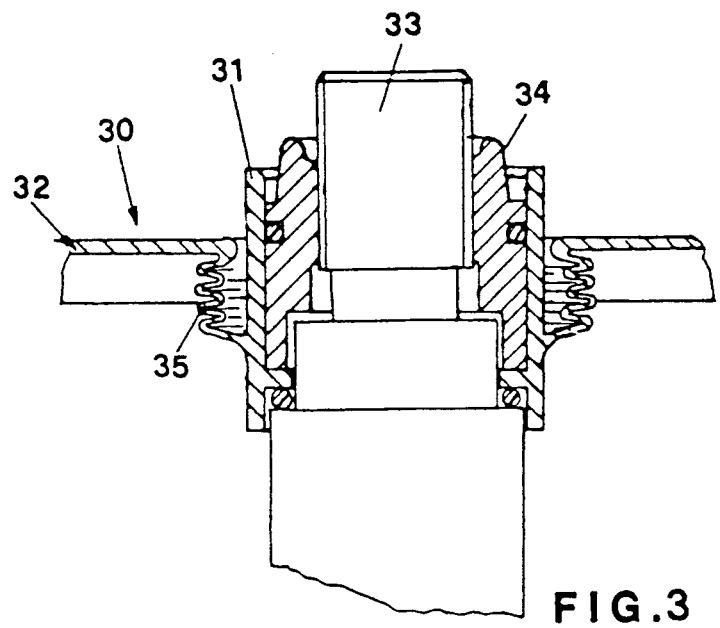
FIG. 3 is another variation of embodiment of the invention.

In the case of FIG. 1 the seal is guaranteed by the circumferential welding between edge 13 of the bush and pole 4. FIG. 3 shows another embodiment of the invention which concerns the elastic diaphragm which, in this case, has the shape of a bellows with a vertical axis and is indicated with 35.

Said diaphragm is also made by moulding of plastic material together with collar 31 and lid 30.

As far as pole 33 and bush 34 receiving the pole are concerned, what has been described and represented in FIG. 2 is applicable. It can be understood that in the case of FIG. 3, too, the elastic diaphragm, represented therein and having the shape of a bellows, guarantees the elasticity necessary in order for collar 31 to be able to follow pole 33 in its vertical displacement, without any deformation of the flat surface 32 of lid 30 to occur.

It will be pointed out that in all the embodiments the collars have outer diiameters nearly equal to the diameter of the openings made in the lid for the passage of the poles, so an absorption of the deformation of the pole is obtained in an opening having nearly the same diameter as the bush, thereby avoiding the breaking of the lid and not compromising the planarity of the lid itself.

On the basis of what has been described it is easy to understand how the invention has fulfilled all the proposed purposes. It is obvious how the solution proposed by the invention can guarantee the perfect expansion of the positive pole even in lids wherein the width only slightly exceeds the diameter of the pole itself.

During the manufacturing phase variations of a constructive nature may be applied, it is however understood that said variations will not exceed the scope of the invention, such as it is claimed hereafter.

I claim:

1. A lid made of plastic material for lead-acid accumulator batteries, comprising an essentially flat surface having a rectangular shape, presenting two openings for the passage of the poles and at least one opening for the inlet of the electrolyte, characterized in that it presents at least in each opening for the passage of the positive poles an externally cylindrical collar having approximately the same diameter of the opening, wherein said collar receives in its interior the bush blocking the pole of the battery and is connected with the lid through an elastic diaphragm having a circular cross-section, wherein the upper edge of said diaphragm is connected with the lid and its lower edge is connected with the outer surface of the collar.

2. A lid according to claim 1, characterized in that the collar and the elastic diaphragm are moulded of plastic material and are integral parts of the lid.

3. A lid according to claim 1, characterized in that the elastic diaphragm acquires a toroidal shape.

4. A lid according to claim 1, characterized in that the elastic diaphragm acquires the shape of a bellows with a vertical axis.

* * * * *